United States Patent

Enomoto et al.

[11] Patent Number: 5,612,772
[45] Date of Patent: Mar. 18, 1997

[54] IMAGE FORMING APPARATUS

[75] Inventors: Yoshihiro Enomoto; Nobuo Hyakutake; Tetsuya Fujita, all of Ebina, Japan

[73] Assignee: Fuji Xerox Co. Ltd., Tokyo, Japan

[21] Appl. No.: 570,547

[22] Filed: Dec. 11, 1995

[30] Foreign Application Priority Data

Dec. 15, 1994 [JP] Japan ................. 6-312138

[51] Int. Cl.$^6$ ............................................. G03G 15/14
[52] U.S. Cl. ....................... 399/315; 399/101; 399/43
[58] Field of Search .......................... 355/271–276, 355/219, 326 R, 327, 215; 430/124, 126

[56] References Cited

U.S. PATENT DOCUMENTS

| | | | |
|---|---|---|---|
| 4,739,363 | 4/1988 | Hoshika et al. | 355/274 |
| 4,843,423 | 6/1989 | Nakamura et al. | 355/274 X |
| 4,984,024 | 1/1991 | Ohkaji et al. | 355/273 |
| 5,049,934 | 9/1991 | Saito | 355/219 |
| 5,132,654 | 7/1992 | Walgrove, III et al. | 355/274 X |
| 5,132,737 | 7/1992 | Takeda et al. | 355/271 |
| 5,200,789 | 4/1993 | Oshiumi | 355/296 |
| 5,249,022 | 9/1993 | Watanabe et al. | 355/271 |
| 5,282,007 | 1/1994 | Oshiumi | 355/274 X |
| 5,298,954 | 3/1994 | Fujita et al. | 355/274 |
| 5,461,461 | 10/1995 | Harasawa et al. | 355/274 X |

FOREIGN PATENT DOCUMENTS

| | | |
|---|---|---|
| 0020768A1 | 1/1981 | European Pat. Off. . |
| 2-247672 | 10/1990 | Japan . |

*Primary Examiner*—Matthew S. Smith
*Attorney, Agent, or Firm*—Oliff & Berridge

[57] ABSTRACT

An image forming apparatus which prevents the toner image, which is transferred onto the recording sheet but not yet fixed thereto, from being scattered, by reducing the amount of the charge, which is generated by the pre-cleaning charge removal means and attaches to a recording sheet on a transfer-member supporting member after it passes the image transfer stage. In the image forming apparatus, a recording sheet is transported in a state that it is electrostatically attracted onto a drum sheet, a toner image is formed on a photoreceptor drum in accordance with image information, and the toner image is transferred from the photoreceptor drum onto the recording sheet by using a transfer corotron disposed on the rear side of the drum sheet. Further, in the image forming apparatus, a conductive plate is provided which substantially prevents the negative charge of the same polarity as of the toner, generated by the pre-cleaning charge removal means, from attaching to the recording sheet after it passes an image transfer stage.

10 Claims, 9 Drawing Sheets

IMAGE FORMING APPARATUS

BACKGROUND OF THE INVENTION

The present invention relates to an image forming apparatus for forming an image on a recording sheet by transferring a toner image, which is formed on an image carrier member, such as a photoreceptor drum, onto the recording sheet. More particularly, the invention relates to an image forming apparatus of the type in which a recording sheet is transported to a toner image transferring stage in a state that the recording sheet is electrostatically supported to a transfer-member supporting member.

In a known image transferring system for transferring a toner image from an image carrier member, for example, a photoreceptor drum, onto a recording sheet, a transfer-member supporting member, such as a dielectric film, disposed between a latent electrostatic image carrier member and a transfer charging means. Corona charge is applied to the rear side of the transfer-member supporting member with a recording sheet that is put into close contact therewith. The recording sheet is electrostatically attracted to the transfer-member supporting member when the latter is charged. By utilizing this feature, the image transferring system may have the three functions; to transfer the toner image onto the recording sheet, to transport the recording sheet, and to separate the recording sheet from the latent electrostatic image carrier member.

This image transferring system is adequate to a color copying machine which requires the function to transfer a multiple of color toner images onto a recording sheet. In the conventional color copying machine, the image transfer drum with the transfer-member supporting member wound thereon is turned in synchronism with the image carrier member. Color toner images of black, yellow, cyan, and magenta are repeatedly transferred onto the recording sheet attractively supported by the transfer-member supporting member.

FIGS. 14A and 14B specifically show this toner image transferring system, which is incorporated into the image transfer stage. In the figure, reference numeral 100 designates an image carrier member; numeral 101, a transfer-member supporting member; 102, a recording sheet; and 103, a transfer charger. As shown in FIG. 14A, the recording sheet 102 arrives at the image transfer stage in a state that the recording sheet 102 is closely put on the transfer-member supporting member 101. At this time, the transfer charger 103 charges the transfer-member supporting member 101 from its reverse side, whereby the transfer-member supporting member 101 is charged with the charge of the polarity that is opposite to the polarity of toner 104. The transfer charger 103 starts the charging operation when the leading edge of the recording sheet reaches the image transferring position, in order to prevent a poor image transfer. In the instance illustrated, the toner for forming a toner image on the image transferring means is negatively charged, while the transfer-member supporting member 101 is positively charged by the transfer charger 103. Accordingly, the toner 104 is transferred from the image carrier member 100 to the recording sheet 102 by the electrostatic attraction, to thereby form a toner image on the recording sheet 102 (FIG. 14B).

Following the transfer of the toner image, the image carrier member moves to a cleaning stage. In this stage, toner left on the surface of the image carrier member is removed by a cleaner. It is a common practice that a pre-cleaning charge removal means for discharging the cleaner is provided at the prestage of the cleaner. A space around the image carrier member is limited. Therefore, the pre-cleaning charge removal means must be located close to the toner image transferring stage.

For this reason, the image forming apparatus based on the above-mentioned image transferring system inherently suffers from the following disadvantages. After the toner image is transferred, as shown in FIG. 15, an excessive amount of charge of the polarity (positive in the illustrated instance) that is opposite to that of the toner 104 is present on the rear side of the transfer-member supporting member 101 after it passes the transfer stage. Accordingly, the charge of the polarity (negative in the illustrated instance) that is the same as that of the toner, which is generated by the pre-cleaning charger 105, is excessively attracted to the recording sheet. The result is to weaken the force to attach the toner image to the recording sheet 102. When that force is weakened, toner of the toner image attached to the recording sheet tends to scatter during the transportation of the recording sheet. The scattering of toner impairs the quality of the transfered toner image. The scattered toner attaches to the component parts disposed around the transfer-member supporting member. In recent quality, color copying machine, the scattering of toner becomes more problematic since the machine uses finer toner of remarkably reduced toner particle diameters.

To solve the problems, another image forming apparatus is disclosed in Published Unexamined Japanese Patent Application Hei-2-247672. In the apparatus, the transfer-member supporting member 101 is surrounded with a conductive plate applied with a voltage of the same polarity as of the toner. Provision of the conductive plate prevents the toner image from being peeled off. The image forming apparatus is still defective, however. Since the transfer-member supporting member is entirely covered with the conductive plate, the size of the image forming apparatus is increased. The electrostatic force acts between the transfer-member supporting member and the recording sheet. The electrostatic force of the recording sheet acting on the transfer-member supporting member is decreased. A problem will arise in the transport of the recording sheet.

One of the effective ways to reduce the amount of charge attracted to the recording sheet by the pre-cleaning charger, is to decrease the voltage applied to the pre-cleaning charger. However, the decreased voltage impairs the ability of the pre-cleaning charger to remove the charge from the image carrier member. When the trailing edge of the recording sheet leaves a location between the transfer-member supporting member and the transfer-member supporting member, a large discharge takes place, so that the surface potential of the image carrier member goes positive in polarity. Therefore, the pre-cleaning charger of the impaired charge removing ability can insufficiently remove the charge from the transfer-member supporting member, particularly a surface region of the image carrier member having been put into contact with the trailing edge of the recording sheet in the image transfer stage.

An approach to reduce the force to pull the charge of the same polarity as of the toner from the pre-cleaning charger to the recording sheet, by removing an excessive amount of charge applied from the transfer charge to the transfer-member supporting member, is also effective for reducing the amount of the charge going to the recording sheet, from the pre-cleaning charger. The charge of the transfer-member supporting member naturally reduces with time after the image transfer. If charge is removed from the transfer-member supporting member immediately after it passes the image transfer stage, the electrostatic force of the recording sheet that acts on the transfer-member supporting member reduces. As a result, a problem will arise in the transportation of the recording sheet. Particularly, in the color copying machine in which the transfer drum is rotated while supporting the recording sheet, when the electrostatic force acting between the recording sheet and the transfer-member supporting member is reduced, the recording sheet slips out of place, so that the transferred color toner images are out of register.

SUMMARY OF THE INVENTION

Accordingly, an object of the present invention is to provide an image forming apparatus which prevents the toner image, which is transferred onto the recording sheet but not yet fixed thereto, from being scattered, by reducing the amount of the charge, which is generated by the pre-cleaning charger and attaches to a recording sheet on a transfer-member supporting member after it passes the image transfer stage.

To achieve the above object, there is provided an image forming apparatus having an image carrier member on which a toner image is formed in accordance with image information, a transfer-member supporting member, disposed adjacent to the image carrier member, being rotated in a state that the transfer-member supporting member attractively supports a recording sheet thereon by an electrostatic force, a transfer charger for transferring the toner image from the image carrier member onto the recording sheet by applying charge of the polarity, which is opposite to that of the toner, to the rear side of the transfer-member supporting member, and a pre-cleaning charge removal means for removing charge from the image carrier member after the toner image is transferred onto the recording sheet, characterized by charge restricting means for substantially preventing the charge of the same polarity as of the toner, generated by the pre-cleaning charge removal means, from attaching to the recording sheet laid on the transfer-member supporting member.

With such a construction, the transfer-member supporting member may be any member if the member allows a toner image to be transferred onto a recording sheet being attractively supported by the member. A specific example of the transfer-member supporting member is a film- or sheet-like member made of dielectric material, such as polyethylene terephthalate or polyvinyliden fluoride. When the transfer-member supporting member is disposed adjacent to the image carrier member, it may be put on a frame to form an image transfer drum or may be stretched between rollers to form a transfer belt.

The charge restricting means may be realized by any means if it is able to restrict or control to a minimum the drift of charge of the same polarity as of the toner, generated by the pre-cleaning charge removal means, toward the transfer-member supporting member. The following three specific examples may be enumerated for the charge restricting means.

The first means is a conductive plate which disposed between the pre-cleaning charge removal means and the transfer-member supporting member, and is grounded. The conductive plate as the first means catches most of charges drifting from the pre-cleaning charge removal means toward the transfer-member supporting member. Therefore, there is less chance that an excessive amount of the charge of the same polarity as of the toner attaches to the recording sheet on the transfer-member supporting member after it passes the image transfer stage.

The conductive plate may be integral with a corona discharge shield of the pre-cleaning charge removal means. It may readily be realized by improving the corona discharge shield.

The second means is an electrode member which is disposed in a space inside of the transfer-member supporting member and applied with a DC bias voltage, to thereby develop an electric field between the corona discharge shield of the pre-cleaning charge removal means and the electrode member. The electric field restricts the drift of the charge of the same polarity as of the toner from the pre-cleaning charge removal means toward the transfer-member supporting member. Therefore, the second means is also able to prevent the charge of the same polarity as of the toner from excessively attaching to the recording sheet after it passes the image transfer stage.

The electrode member must be disposed adjacent to the transfer charger in a space inside of the transfer-member supporting member. Accordingly, the charge of the polarity that is opposite to that of the toner generated by the transfer charger, flows into the electrode member. As a result, there is a danger that the transferring efficiency is deteriorated. To avoid this, the electrode member is preferably covered with a dielectric layer or a dielectric sheet is preferably located between the electrode member and the transfer charger.

The third means is a charge-removal electrode member which is disposed in a space inside of the transfer-member supporting member and is grounded, to thereby remove the charge of the polarity that is opposite to the polarity of the toner attached to the rear side of the transfer-member supporting member. The third means removes the charge of the polarity that is opposite to the polarity of the toner. Therefore, the drift of the charge of the same polarity as of the toner, generated by the pre-cleaning charge removal means, toward the transfer-member supporting member, is restricted. Accordingly, the third means is also able to prevent the charge of the same polarity as of the toner from excessively attaching to the recording sheet after it passes the image transfer stage. The shape of the charge-removal electrode is not limited to any special shape in particular. The fact that when the top face of the charge-removal electrode, which faces the transfer-member supporting member, is shaped to have peaks, the charge is most effectively removed, was confirmed by our experiment.

Also in the third means, there is a danger that the charge of the polarity that is opposite to that of the toner generated by the transfer charger flows into the peaks of the electrode. Accordingly, it is preferable to entirely cover the charge removal electrode, except the portion thereof facing the drum sheet 35, with a dielectric member.

To more effectively reduce the charge of the same polarity as of the toner to be attached to the recording sheet, it is effective to decrease the voltage to be applied to the pre-cleaning charge removal means, to thereby reduce the amount of generated charge per se. However, this approach can insufficiently remove charge on a surface region of the image carrier member having been put into contact with the trailing edge of the recording sheet in the image transfer stage, as described above.

Where the charge restricting means of the present invention is used, the voltage applied to the pre-cleaning charge removal means is preferably controlled such that usually, a voltage lower than in the conventional apparatus is applied to the pre-cleaning charge removal means, and the voltage is increased only when the region of the surface of the image carrier member having been brought into contact with the trailing edge of the recording sheet in the image transfer stage passes the pre-cleaning charge removal means in a manner that the passing of the surface region of the image carrier member is detected, and the voltage is increased at the timing of the detection.

In a color copying machine, for example, color toner images are repeatedly transferred from the image carrier member onto the recording sheet while the transfer-member supporting member, which attractively supports a recording sheet, is continuously turned. In this case, the charge of the polarity that is opposite to that of the toner attached to the rear side of the transfer-member supporting member disappears with the turn of the transfer-member supporting member. In this state, the toner of the toner image transferred onto the recording sheet tends to scatter toward the component parts disposed around the transfer-member supporting member.

To cope with this, the charge of the polarity that is opposite to that of the toner is preferably applied to the rear side of the transfer-member supporting member every turn of the passing recording sheet.

The charge restricting means for restricting the drift of charge of the same polarity as of the toner, generated by the pre-cleaning charge removal means, toward the transfer-member supporting member, whereby the charge is substantially prevented from attaching to the recording sheet on the transfer-member supporting member. Accordingly, there is less chance that the charge of the same polarity of the toner, generated by the pre-cleaning charge removal means, excessively pours onto the recording sheet 30 after it passes the image transfer stage. No reduction of the force to attach the toner image onto the recording sheet is made.

DETAILED DESCRIPTION OF PREFERRED EMBODIMENTS

The preferred embodiments of an image forming apparatus according to the present invention will be described with reference to the accompanying drawings.

Figure 1:
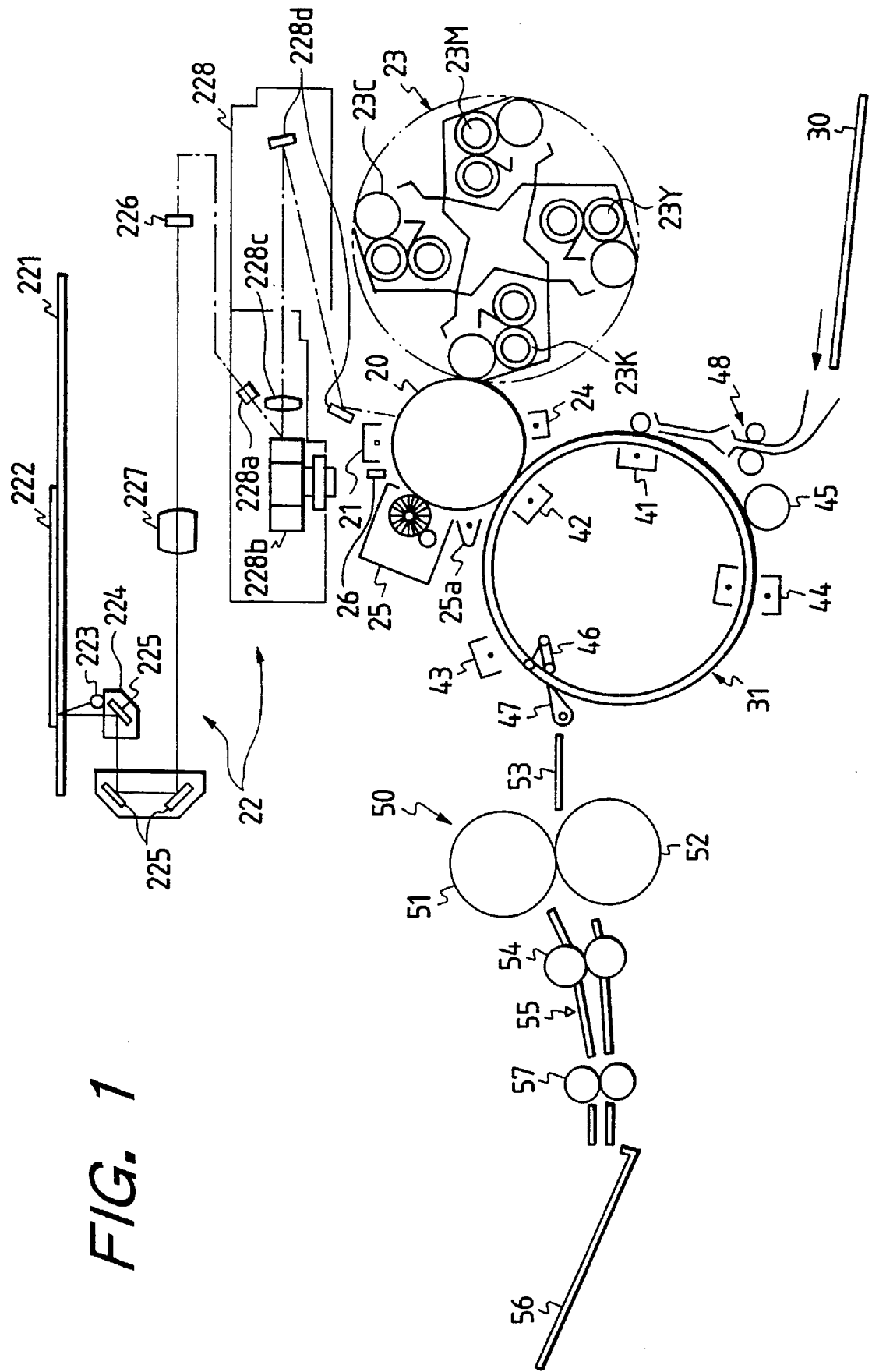
FIG. 1 is a diagram showing a color copying machine according to a first embodiment of the present invention.

FIG. 1 is a view showing a color copying machine according to a first embodiment of the present invention.

In the figure, reference numeral 20 designates a photoreceptor in the form of a drum; 21, a charger scorotron for charging the surface of the photoreceptor drum 20 in advance; and 22, an exposure-scan system for writing a latent electrostatic image on the surface of the photoreceptor drum 20, which is previously charged by the charger scorotron 21. Reference numeral 23 designates a developing rotor which includes four developing units 23K, 23C, 23M and 23Y for developing latent electrostatic images into color toner images of black (K), cyan (C), magenta (M) and yellow (M). Numeral 24 represents a pre-transfer corotron for charging a developing latent toner image on the photoreceptor drum 20; 25, a cleaner for removing residual toner on the photoreceptor drum 20; 25a, a pre-cleaning corotron; and 26, an eraser lamp for removing residual charge from the surface of the photoreceptor drum 20.

In the present embodiment, the exposure/scan system 22 is made up of an exposure lamp 223 for irradiating an original document 222 located on a platen 221, a carriage 224 for moving the exposure lamp 223 over the entire area of the original document 222, a reflecting mirror 225 for guiding a light beam reflected from the surface of the original document 222 along a predetermined optical path, a color image sensor 226 for converting the light reflected from the surface of the original document 222 into digital signals of the respective color component parts, an image forming lens 227 for focusing light beams from the surface of the original document 222 onto the color image sensor 226, to thereby form an image thereon, and a laser scanning unit 228 for scanning the surface of the photoreceptor drum 20 in the fast scan direction with a laser beam in accordance with the color image signals outputted from the color image sensor 226. The laser scanning unit 228 includes a laser 228a, for example, a semiconductor laser, a polygonal mirror 228b for swinging a light beam from the semiconductor laser 228a in the fast scan direction on the photoreceptor drum 20, an image forming lens 228c for focusing light beams from the semiconductor laser 228a along the fast scan line on the photoreceptor drum 20, and a reflecting mirror 228d for controlling the beam path.

Figure 2:
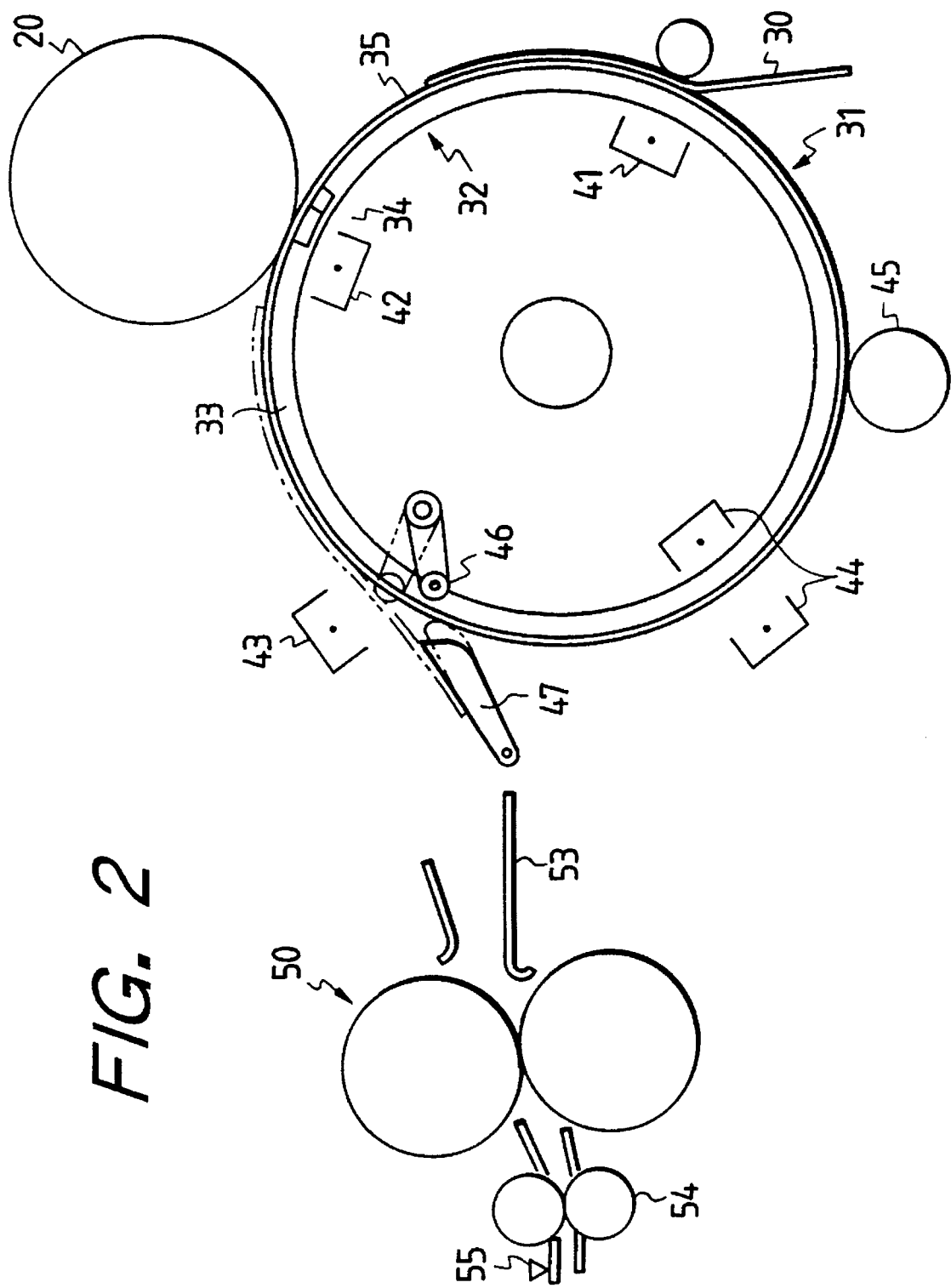
FIG. 2 is a diagram showing an image transfer drum and its related component parts in the color copying machine.

Numeral 31 designates an image transfer drum. A recording sheet 30 is wound over the image transfer drum 31. Color toner images are successively transferred from the photoreceptor drum 20 onto the recording sheet 30 in a superposing manner. In the construction of the image transfer drum 31, as shown in FIG. 2, a drum sheet 35 made of polyvinylidene fluoride is laid over a drum frame 32, which is constructed with a pair of ring members 33 tied with a tie bar 34. The drum sheet 35 is charged in advance so as to electrostatically attract the recording sheet 30 to it.

The following component parts are disposed along, and inside and outside the shell of the image transfer drum 31: an attraction corotron 41 for charging the drum sheet 35 when it electrostatically or attractively holds the recording sheet 30 supported thereon, a transfer corotron 42 for transferring a toner image from the photoreceptor drum 20 to the recording sheet 30, a charge removal corotron 43 for removing the charge from the recording sheet 30 after the final color transfer process is completed, a cleaning charge removal corotron 44 for removing charge from the drum sheet 35 after the final color transfer process is completed, a cleaning brush 45 for removing paper particles from the drum sheet 35 after the final color transfer process is completed, and a push roll 46 for pushing up the inside of the drum sheet 35 when the recording sheet 30 is peeled off the drum sheet 35. Reference numeral 48 designates a sheet transport system which receives the recording sheet 30 from a sheet supply cassette (not shown), and transports it toward the attraction corotron 41 at a preset timing based on each mode.

Numeral 50 designates a fixing unit for fixing a toner image on the recording sheet 30. In the fixing operation, the recording sheet 30 with a toner image formed thereon is passed through the fixing unit 50. To be more specific, the fixing unit 50 is composed of a heating roll 51 containing a heater therein and a pressure roller 52 disposed pressed against the heating roll 51. The recording sheet 30 that comes from the image transfer drum 31 is transported to the fixing unit 50, through a guide plate 53. Reference numeral 54 designates a fuser exit roll pair for transporting forward the recording sheet 30 emanating from the fixing unit 50; 55, a fuser exit switch 55 for detecting the trailing edge of the recording sheet 30 emanating from the fixing unit 50; 56, an exit tray for receiving the recording sheets 30 with toner images fixed thereon; and 57, an exit roll pair for transporting the recording sheet 30 to the exit tray 56.

To operate the color copying machine thus constructed, a user turns on a start switch of the color copying machine. Through the first turn of the image transfer drum 31, the copying machine is cycled up. At a preset timing corresponding to the second turn of the image transfer drum 31, the original document 222 is scanned, to thereby write a latent electrostatic image for black K onto the photoreceptor drum 20. At this time, the developing rotor 23 sets the black developing unit 23K at a position where it faces the photoreceptor drum 20. The black developing unit 23K develops the latent electrostatic image slightly after the image writing timing.

Figure 3:
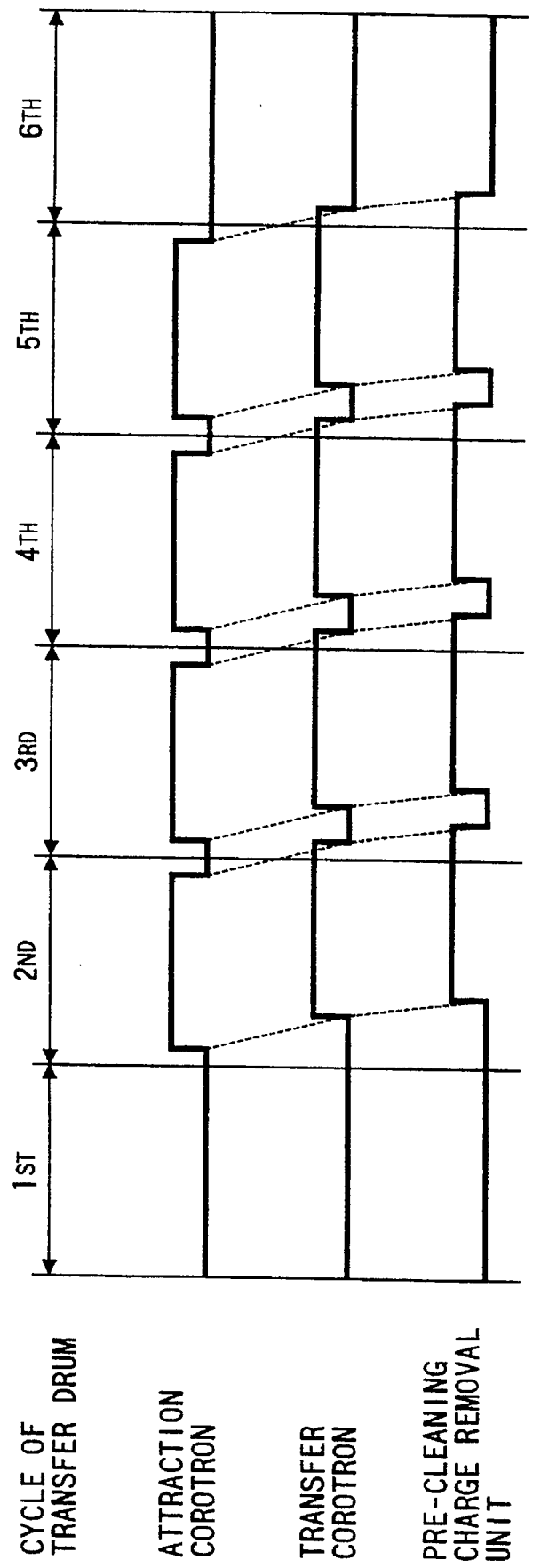
FIG. 3 is a timing chart showing the operation of the attraction corotron, a transfer corotron, and a pre-cleaning corotron in the color copying machine.

The operation of the image transfer drum 31 is charted as shown in FIG. 3. As shown, in the second turn of the image transfer drum 31, the attraction corotron 41, the attraction corotron 41 operates, so that the recording sheet 30 is attracted onto the image transfer drum 31. Then, the transfer corotron 42 operates after the operation of the attraction corotron 41, with a time lag corresponding to the transportation of the recording sheet 30 from the attraction stage to the transfer stage. As a result, the toner image of black K is transferred onto the recording sheet 30 supported on the image transfer drum 31, from the photoreceptor drum 20. Also in the second turn, the pre-cleaning charge removal means 25a is operated slightly after the operation of the pre-transfer corotron 24, to thereby remove charge from the surface of the photoreceptor drum 20 leaving the toner image transferring stage. The current black developing unit is replaced with the next developing unit before the second turn of the image transfer drum 31 is completed. Specifically, the developing rotor 23 is turned by 90° to move the next yellow developing unit 23Y to a position where it faces the photoreceptor drum 20.

Subsequently, the sequence of these operations is repeated every turn of the photoreceptor drum 20. In the third turn, a toner image of yellow Y is transferred onto the recording sheet 30 supported on the image transfer drum 31. In the fourth turn, a toner image of magenta M is transferred onto the recording sheet 30. In the fifth turn, a toner image of cyan C is transferred onto the recording sheet. In this way, the toner images of four colors are sequentially superposed to form a full color image onto the recording sheet 30. After the toner image of cyan C is transferred onto the recording sheet 30, the recording sheet is peeled off the image transfer drum 31, and transported to the fixing unit 50. The fixing unit fixes the color toner image of four colors on the recording sheet. The recording sheet with the fixed color toner image is discharged into the exit tray 56.

In the third to fifth turns of the image transfer drum 31, the attraction corotron 41 is operated every turn of the drum, to thereby supply a sufficient amount of charge to the rear side of the drum sheet 35 of the image transfer drum 31. The discharge output of the attraction corotron 41 takes the form of a constant current of the positive polarity: It is 140 μA when the relative humidity is 60% or higher, and is 84 μA when the humidity is lower than 60%. With such a discharge current, there is no chance that the recording sheet 30 is peeled off the drum sheet 35 during the continuous run of the image transfer drum 31. Further, the toner image that is transferred onto the recording sheet 30 but not yet fixed will never be scattered to the component parts around the image transfer drum 31.

Figure 4:
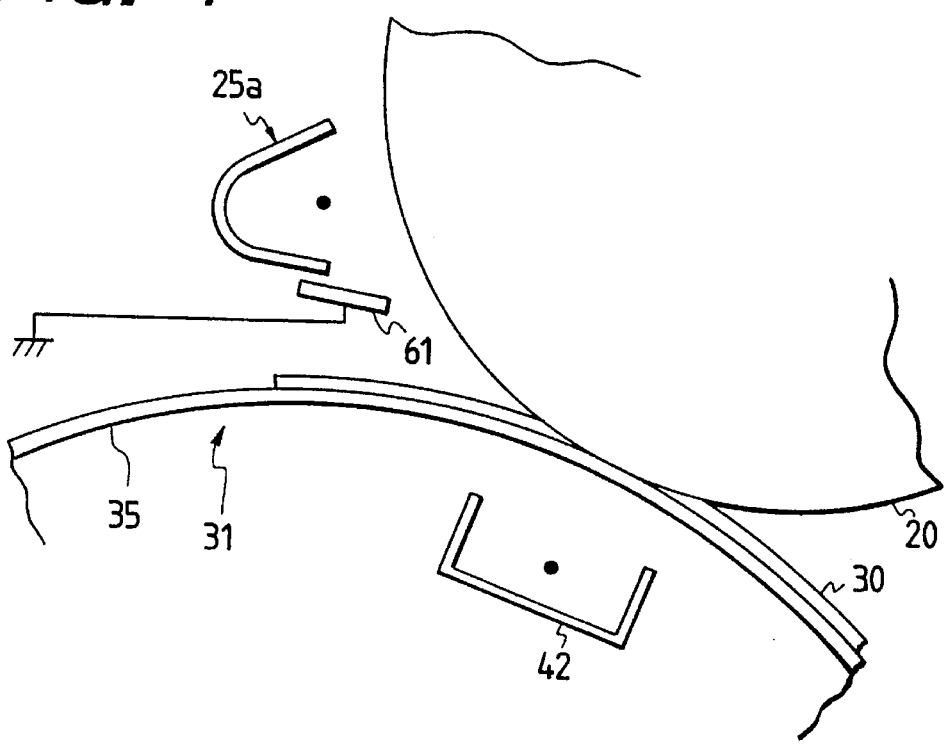
FIG. 4 is an enlarged view showing a portion including mainly a toner image transfer stage of the copying machine according to the first embodiment of the present invention, which is a key portion of the first embodiment.

FIG. 4 is an enlarged view showing a portion around the toner image transfer stage of the copying machine.

A charge restricting means is used in the embodiment under discussion. The charge restricting means functions to restrict the flow of the charge that is generated by the pre-cleaning charge removal means 25a and has the same polarity (negative) as of the toner into the recording sheet 30. The charge restricting means takes the form of a conductive plate 61, which is located between the pre-cleaning charge removal means 25a and the image transfer drum 31. The conductive plate 61, together with the machine body, is grounded. More specifically, the conductive plate 61 is located at a position 10 mm or shorter distanced from the drum sheet 35 of the image transfer drum 31 and 7 mm distanced from the corona wire of the pre-cleaning charge removal means 25a toward the photoreceptor drum 20.

Figure 5:
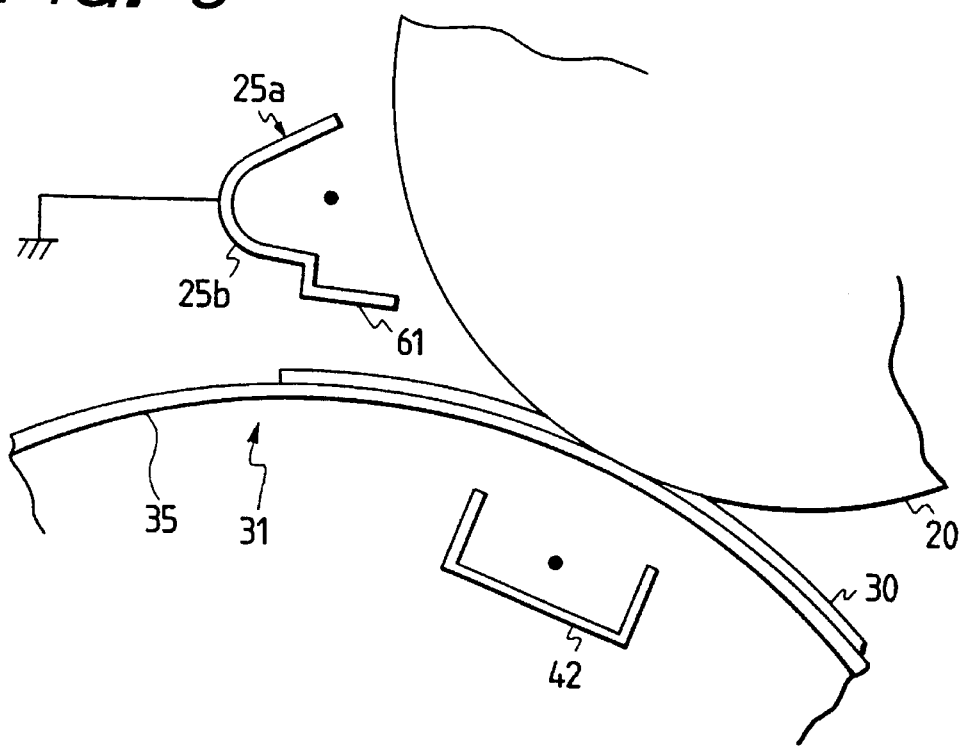
FIG. 5 is an enlarged view showing a portion including mainly a toner image transfer stage of the copying machine, the illustration showing a modification of the pre-cleaning corotron.

There is shown another conductive plate 61 in FIG. 5. As shown, the conductive plate 61 is integral with a discharge shield 25b of the pre-cleaning charge removal means 25a, and the discharge shield 25b is grounded.

The charge restricting, conductive plate 61 electrically shields the image transfer drum 31 from the pre-cleaning charge removal means 25a. The negative charge going from the pre-cleaning charge removal means 25a to the image transfer drum 31 flows into the conductive plate 61. With provision of the conductive plate 61, there is less chance that the negative charge is excessively injected into the recording sheet 30 after it passes the image transfer stage, in a state that as the result of the operation of the transfer corotron 42, an excessive amount of the charge is present on the rear side of the drum sheet 35. The charge stored in the recording sheet 30 is balanced with the charge in the drum sheet 35. Thus, the use of the conductive plate 61 effectively prevents toner from being scattered from the toner image on the recording sheet 30 to the component parts around the image transfer drum.

Figure 6:
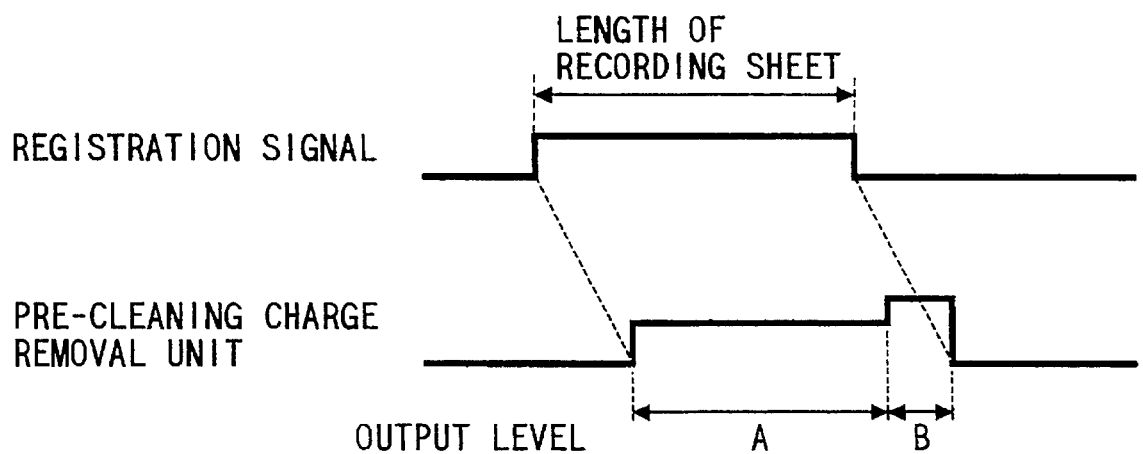
FIG. 6 is a timing chart showing the pre-cleaning corotron in the color copying machine according to the first embodiment of the present invention.

Further, a technical measure for reducing a charge amount of the charge generated by the pre-cleaning charge removal means 25a is used in the color copying machine of the present embodiment. To this end, the operation of the pre-cleaning charge removal means 25a is controlled depending on the size of the recording sheet 30. More specifically, to transfer a toner image of the first color onto the recording sheet 30, the pre-cleaning charge removal means 25a is operated at a preset timing in synchronism with a registration signal that is outputted from a sheet sensor (not shown) provided in the sheet transport system 48 (FIG. 6). To transfer the toner images of the second and subsequent colors, the pre-cleaning charge removal means 25a is operated at preset timings, which are selected taking the periods of rotation of the image transfer drum 31.

The surface potential of the photoreceptor drum 20 has a history. The surface potential history depends on locations of the recording sheet which the photoreceptor drum 20 has been put into contact with in the image transfer stage. Therefore, in the present embodiment, the discharge output level of the pre-cleaning charge removal means 25a is varied depending on a location on the recording sheet 30 (as longitudinally viewed) which a surface region of the photoreceptor drum 20 passing the pre-cleaning charge removal means 25a has been put into contact with in the image transfer stage. When the trailing edge of the recording sheet 30 is peeled off the photoreceptor drum 20, a discharge takes place between them. At this time, the photoreceptor drum 20 experiences a large potential variation. In the present embodiment, as shown in FIG. 6, the output level of the pre-cleaning charge removal means 25a is increased to a relatively high level (denoted as B in FIG. 6) for removing the charge the surface region of the photoreceptor drum 20, which has been put into contact with the trailing edge of the recording sheet 30 in the image transfer stage. For removing the charge from the remaining area on the surface of the photoreceptor drum 20, the pre-cleaning charge removal means 25a produces a discharge output level denoted as A, which is lower than the output level B.

Figure 7:
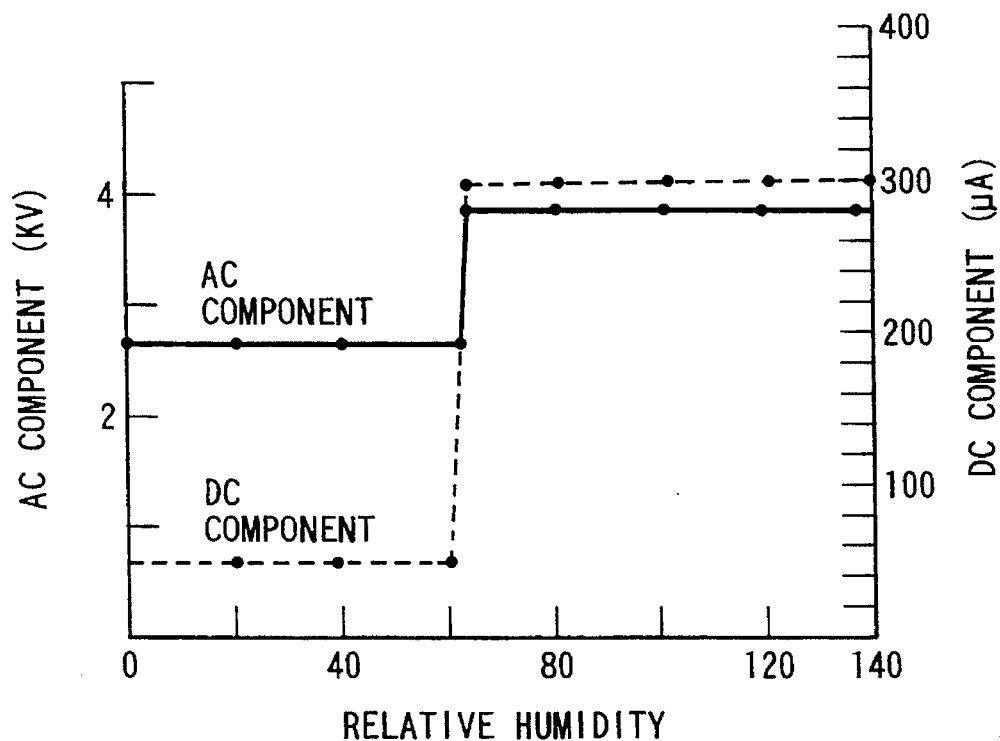
FIG. 7 is a graph showing a variation of the discharge output of the pre-cleaning corotron with respect to relative humidity.

The discharge output A of the pre-cleaning charge removal means 25a consists of only an AC voltage of 2.7 V in effective value. The discharge output B is controlled in accordance with a humidity measure. As shown in FIG. 7, when the relative humidity is 60% or higher, the discharge output B consists of an AC voltage of 3.8 kV in effective value and an AC current of −300 µA. When the relative humidity is lower than 60%, the discharge output B consists of an AC voltage of 2.7 kV in effective value and an AC current of −50 µA.

Thus, in the present embodiment, the discharge output of the pre-cleaning charge removal means 25a is controlled in conformity with the surface potential history of the photoreceptor drum 20. Further, a chance that an excessive amount of charge is injected into the recording sheet 30 after it passes the image transfer stage is lessened to that extent.

Also in the present embodiment, the discharge output of the pre-cleaning charge removal means 25a is controlled in accordance with relative humidity. This discharge output control is made for optimizing the discharge output of the pre-cleaning charge removal means 25a for the ambient condition where the machine is used. This feature also minimizes the generation of the excessive amount of charges by the pre-cleaning charge removal means 25a, and the injection of the negative charge into the recording sheet 30.

A second embodiment of a color copying machine according to the present invention will be described.

Figure 8:
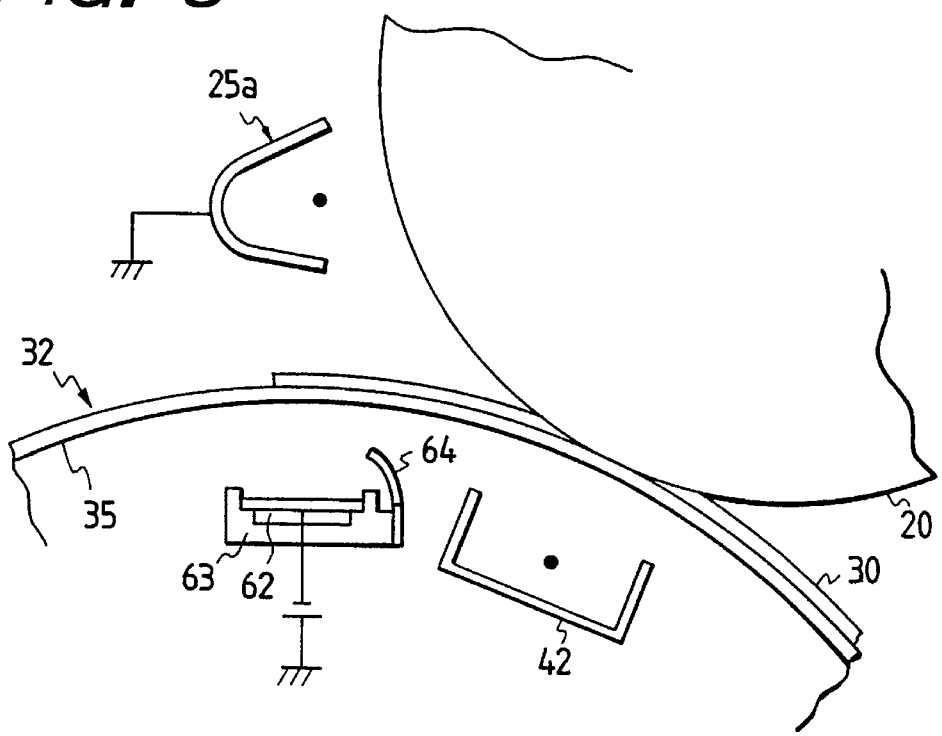
FIG. 8 is an enlarged view showing a portion including mainly a toner image transfer stage in a color copying machine according to a second embodiment of the present invention, which is a key portion of the second embodiment.

FIG. 8 is an enlarged view showing a portion including mainly a toner image transfer stage in a color copying machine according to a second embodiment of the present invention, which is a key portion of the second embodiment.

Figure 9:
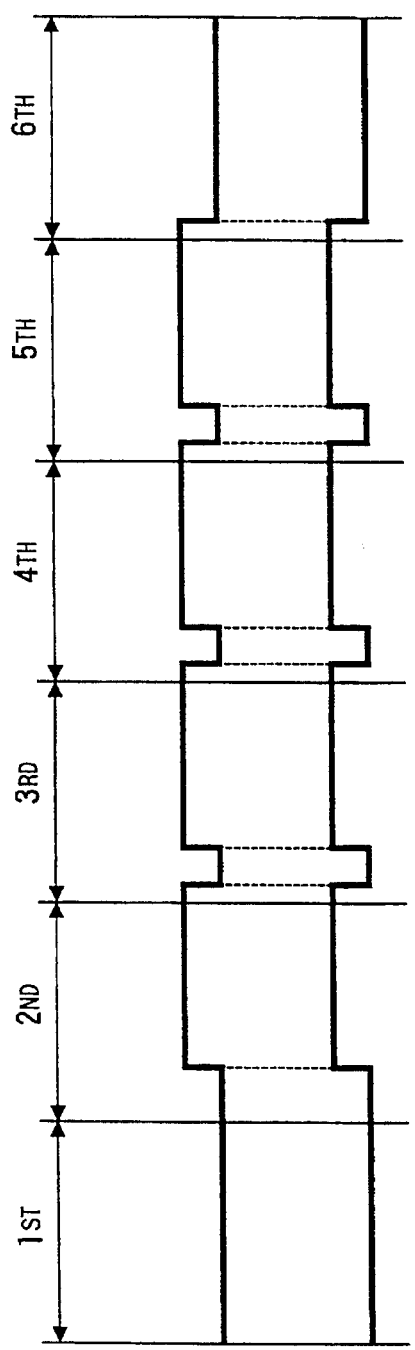
FIG. 9 is a timing chart showing an operation of an electrode member used in the second embodiment.

In the second embodiment, the charge restricting means takes the form of an electrode member 62. As shown, inside of the image transfer drum 31, the electrode member 62 is disposed in opposition to the pre-cleaning charge removal means 25a. A DC bias voltage is applied to the electrode member 62. The electrode member 62 is held by an insulation holder 63. The dimension of the electrode member 62 when measured in the axial width of the image transfer drum 31 corresponds to the width of the recording sheet 30 of the largest size, which is attractively set on the image transfer drum 31. The dimension of the electrode member 62 when measured in the circumferential direction is approximately 15 mm. The electrode member 62 is spaced 11 mm or shorter from the drum sheet 35 and 12 to 15 mm from the transfer corotron 42. A DC bias voltage of −3 kV is applied to the electrode member 62 in synchronism with the discharging timing of the transfer corotron 42 (FIG. 9). Alternatively, the DC bias voltage may be applied in synchronism with the discharging timing of the pre-cleaning charge removal means 25a (FIG. 3).

The transfer corotron 42, located adjacent to the electrode member 62, is provided for positively charging the rear side of the drum sheet 35. Accordingly, when a negative DC bias voltage is applied to the electrode member 62, the discharge current of the transfer corotron 42 flows into the electrode member 62. Such a flow of the discharge current possibly deteriorates the transferring efficiency when the toner image is transferred from the photoreceptor drum 20 to the recording sheet 30, and possibly weakens an electric field formed between the electrode member 62 and the pre-cleaning charge removal means 25a. To prevent the discharge current from flowing into the electrode member 62, a flexible sheet 64 is used in the present embodiment. The flexible sheet 64 is made of dielectric material, such as polyethylene terephthalate (PET). As shown, the flexible sheet 64 is extended upward from the top of the side of the insulation holder 63, which is closer to the transfer corotron 42. The charge removal corotron 43 holds the electrode member 62, as already referred to. Thus, the flexible sheet 64 is located between the electrode member 62 and the transfer corotron 42, thereby blocking the flow of the discharge current from the transfer corotron 42 to the electrode member 62. To ensure the blocking of the current flow to the electrode member 62, the tip of the electrode member 62 is spaced from the drum sheet 35 by 4 mm. The tie bar 34 of the image transfer drum 31, with the turn of the drum 31, comes in contact with the flexible sheet 64, and bends it toward the electrode member 62.

In the construction of the second embodiment, when a DC bias voltage is applied to the electrode member 62, an electric field is developed between the electrode member 62 and the pre-cleaning charge removal means 25a. The electric field developed is directed from the electrode member 62 to the pre-cleaning charge removal means 25a. The electric field restricts the drift of the negative charge of the same polarity as of the toner, generated by the pre-cleaning charge removal means 25a, toward the image transfer drum 31. Therefore, the second embodiment is also able to prevent the charge of the same polarity as of the toner from being excessively injected into the recording sheet 30 after it passes the image transfer stage. The charge stored in the recording sheet 30 is well balanced with that stored in the drum sheet 35. As a result, the toner of the toner image, not yet fixed, on the recording sheet 30 is effectively prevented from being scattered.

Figure 10:
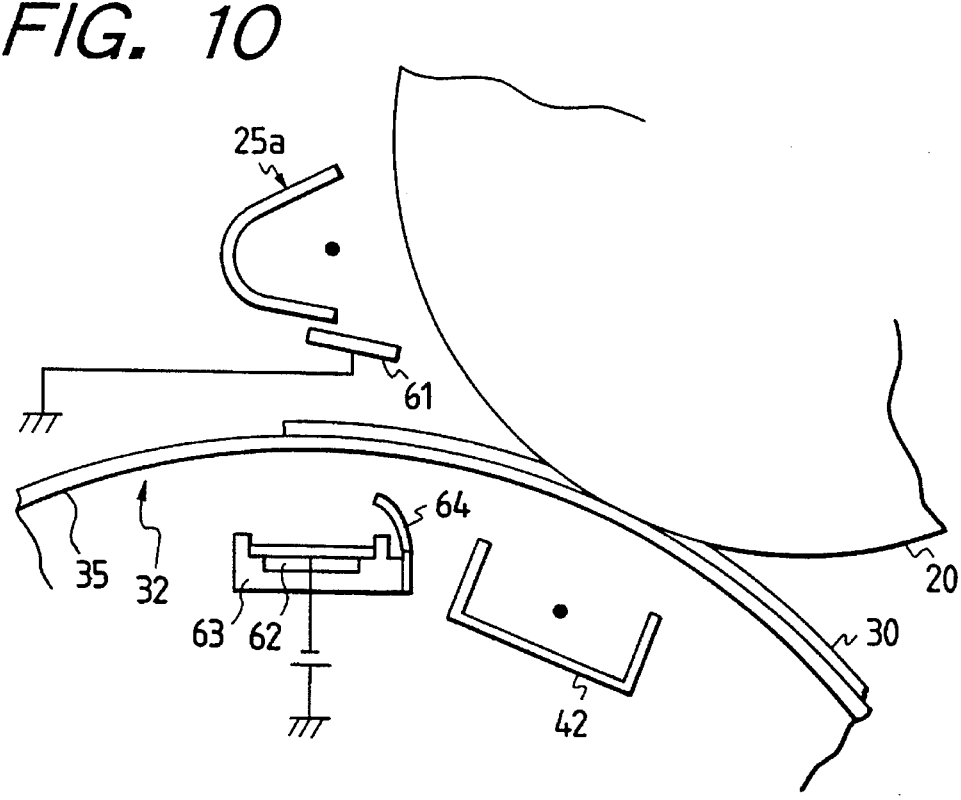
FIG. 10 is an enlarged view showing a portion including mainly a toner image transfer stage in a color copying machine according to another embodiment of the present invention, which is the combination of the first and the second embodiment.

As shown in FIG. 10, the second embodiment may be combined with the first embodiment. The construction of FIG. 10 more effectively restricts the drift of the negative charge of the same polarity as of the toner, generated by the pre-cleaning charge removal means 25a, toward the image transfer drum 31.

The remaining construction of the second embodiment is the same as that of the first embodiment. The same thing is true for the specific image forming process including the pre-cleaning charge removal means 25a and the attraction corotron 41.

A third embodiment of the present invention will be described hereunder.

Figure 11:
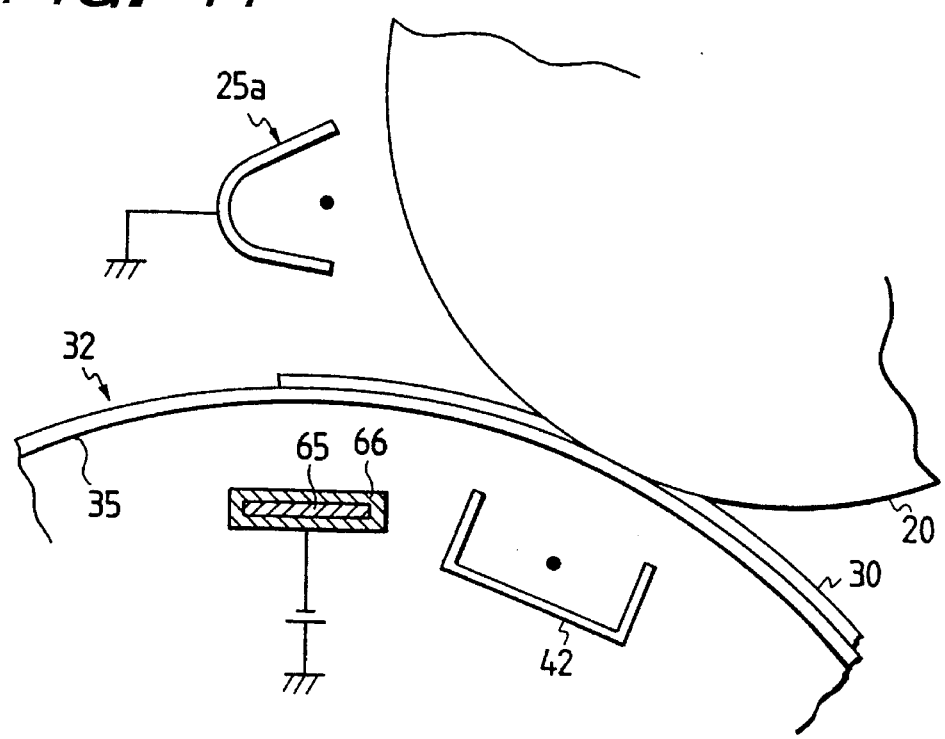
FIG. 11 is an enlarged view showing a portion including mainly a toner image transfer stage in a color copying machine according to a third embodiment of the present invention, which is a key portion of the third embodiment.

FIG. 11 is an enlarged view showing a portion including mainly a toner image transfer stage in a color copying machine according to a third embodiment of the present invention.

Also in the third embodiment of the present invention, an electrode member 65 is used for the charge restricting means as in the first embodiment. As shown, the electrode member 65 is disposed inside of the image transfer drum 31, and applied with a DC bias voltage. A specific placement of the electrode member 65 and the value of the bias voltage are the same as those in the second embodiment. In the third embodiment, the electrode member 65 is covered with a dielectric layer 66. To this end, it is wound with a dielectric tape. The surface resistance of the dielectric layer 66 is set at approximately $10^{15}$ to $10^{16}$. The reason why the electrode member 65 is covered with the dielectric layer 66 is the same as that why the flexible sheet 64 is used in the second embodiment.

Therefore, the third embodiment is also able to restrict the drift of the negative charge of the same polarity as of the toner, generated by the pre-cleaning charge removal means 25a, toward the image transfer drum 31. The charge stored in the recording sheet 30 is well balanced with that stored in the drum sheet 35. As a result, the toner of the toner image, not yet fixed, on the recording sheet 30 is effectively prevented from being scattered.

The remaining construction of the third embodiment is the same as that of the first embodiment. The same thing is true for the specific image forming process including the pre-cleaning charge removal means 25a and the attraction corotron 41.

A fourth embodiment of the present invention will be described hereunder.

Figure 12:
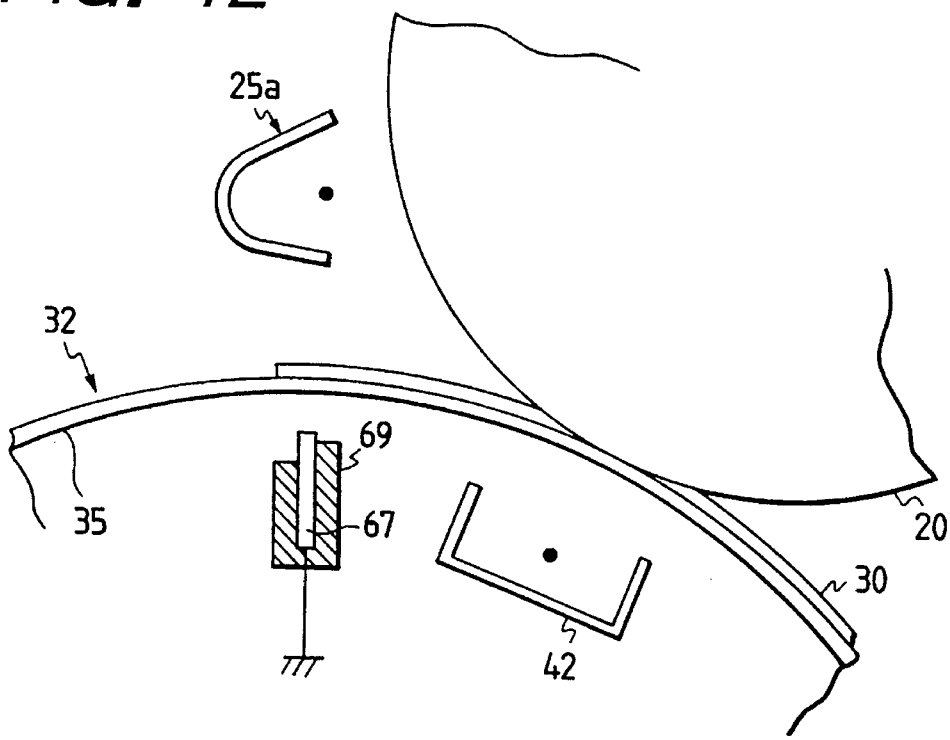
FIG. 12 is an enlarged view showing a portion including mainly a toner image transfer stage in a color copying machine according to a fourth embodiment of the present invention, which is a key portion of the fourth embodiment.
Figure 14A:
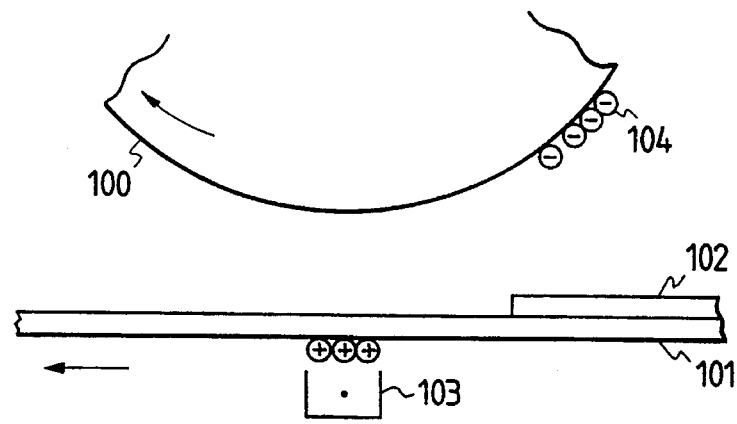
FIG. 14A and FIG. 14 B are diagrammatic views for explaining the principle of the image transfer in an image transferring stage.
Figure 14B:
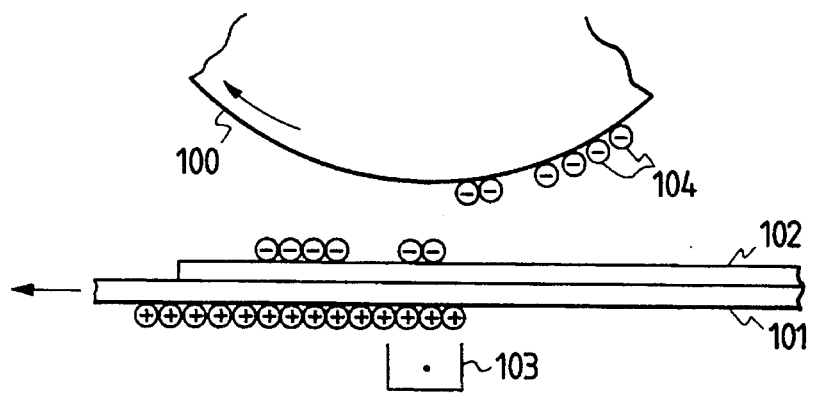
Figure 15:
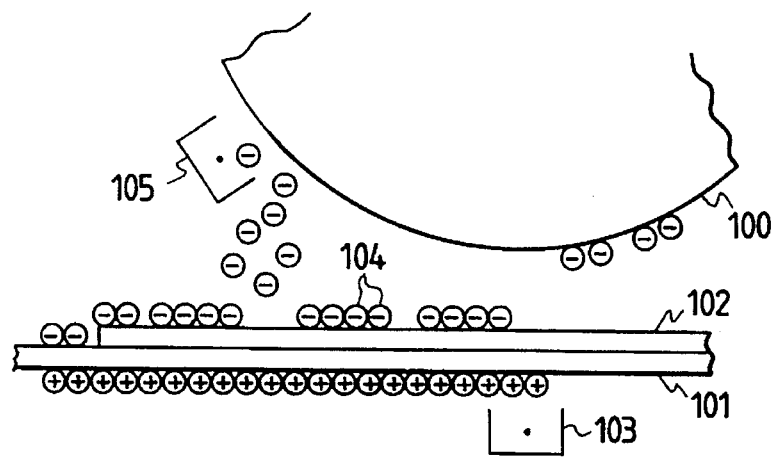
FIG. 15 is a diagram for explaining the problems of the conventional art.

FIG. 12 is an enlarged view showing a portion including mainly a toner image transfer stage in a color copying machine according to a fourth embodiment of the present invention.

In the fourth embodiment, the charge restricting means is realized by a charge-removal electrode 67. The charge-removal electrode 67 is disposed in opposition to the pre-cleaning charge removal means 25a, inside the image transfer drum 31. A DC bias voltage is applied to the charge-removal electrode 67. The charge-removal electrode 67, together with the machine body, is earthed. The charge-removal electrode 67 is formed of a stainless plate of approximately 0.1 mm thick. The dimension of the electrode member 67 when measured in the axial width of the image transfer drum 31 corresponds to the width of the recording sheet 30 of the largest size. The electrode member 67 is spaced 11 mm or shorter from the drum sheet 35 and 12 to 15 mm from the transfer corotron 42. The charge-removal electrode 67, except the portion thereof facing the drum sheet 35, is entirely covered with a dielectric holder 69.

Figure 13:
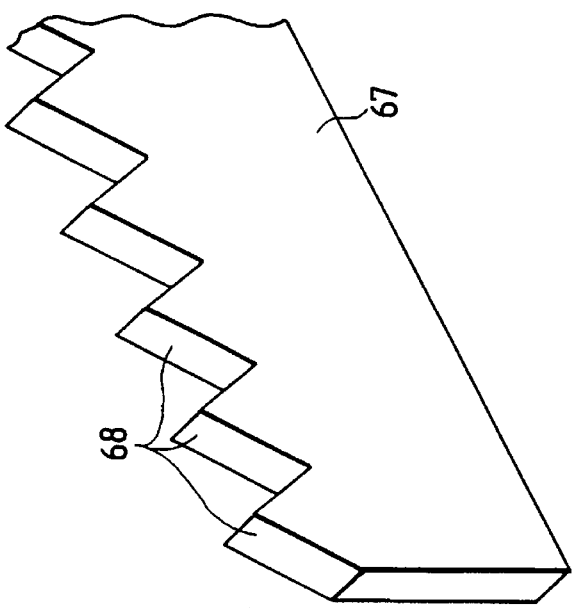
FIG. 13 is a perspective view showing a charge-removal electrode used in the fourth embodiment of the present invention.

The top face of the charge-removal electrode 67, which confronts with the drum sheet 35, is shaped like a sawtooth, as shown in FIG. 13. A proper quantity of the discharge current from the transfer corotron 42 flows into the apices of the projections 68 of the top of the charge-removal electrode 67, so as to prevent an excessive amount of positive charge from being attached to the rear side of the drum sheet 35. Here, the proper quantity of the discharge current flowing into the apices is selected at a value of approximately 10% of the total discharge current from the transfer corotron 42, not impairing the transfer efficiency of the toner image.

In the fourth embodiment thus constructed, the charge (positive charge) of the polarity that is opposite to that of the toner, which is present on the rear side of the drum sheet 35, is not excessive in amount. Accordingly, an electrostatic force to move the negative charge generated by the pre-cleaning charge removal means 25a toward the drum sheet 35 is reduced. There is successfully eliminated the injection of an excessive amount of the negative charge into the recording sheet 30 after it passes the image transfer stage. The charge stored in the recording sheet 30 is well balanced with that stored in the drum sheet 35. As a result, the toner of the toner image, not yet fixed, on the recording sheet 30 is effectively prevented from being scattered toward those component parts around the image transfer drum.

The remaining construction of the fourth embodiment is the same as that of the first embodiment. The same thing is true for the specific image forming process including the pre-cleaning charge removal means 25a and the attraction corotron 41.

As seen from the foregoing description, the image forming apparatus of the present invention includes a charge restricting means. Provision of the charge restricting means provides many advantageous features. There is less chance that an excessive amount of the negative charge of the same polarity as of the toner, generated by the pre-cleaning corotron, drifts toward the recording sheet 30 after it passes the image transfer stage. Accordingly, the force to attach the toner image to the recording sheet is not reduced. The toner of the toner image, transferred to but not yet fixed onto the recording sheet, is prevented from being scattered to the component parts around the image transfer drum in the image forming apparatus. As a result, a beautiful color image, not disturbed, is formed on the recording sheet. Those component parts around the image transfer drum are not soiled with the scattered toner.

What is claimed is:

1. An image forming apparatus, comprising:

an image carrier member on which a toner image is formed in accordance with image information;

a transfer-member supporting member, disposed adjacent to the image carrier member, being rotated in a state that the transfer-member supporting member attractively supports a recording sheet thereon by an electrostatic force;

a transfer charger for transferring the toner image from the image carrier member onto the recording sheet by applying charge of the polarity, which is opposite to that of the toner, to the rear side of the transfer-member supporting member;

pre-cleaning charge removal means for removing charge from the image carrier member after the toner image is transferred onto the recording sheet; and charge restricting means for substantially preventing the charge of the same polarity as of the toner, generated by the pre-cleaning charge removal means, from attaching to the recording sheet laid on the transfer-member supporting member, said charge restricting means, said transfer charger and said pre-cleaning charge removal means being disposed in close proximity with each other so that the toner image, after being transferred onto the recording sheet, is prevented from being scattered.

2. The image forming apparatus according to claim 1, wherein said charge restricting means includes a conductive plate disposed between the pre-cleaning charge removal means and the transfer-member supporting member, said conductive plate being grounded.

3. The image forming apparatus according to claim 2, wherein said conductive plate is integral with a corona discharge shield of the pre-cleaning charge removal means.

4. The image forming apparatus according to claim 1, wherein said charge restricting means includes an electrode member disposed in a space inside of the transfer-member supporting member and applied with a DC bias voltage.

5. The image forming apparatus according to claim 4, wherein said electrode member is covered with a dielectric layer.

6. The image forming apparatus according to claim 5, wherein a dielectric sheet is located between the electrode member and the transfer charger.

7. The image forming apparatus according to claim 1, wherein the charge restricting means includes a charge-removal electrode member disposed in a space inside of the transfer-member supporting member and is grounded.

8. The image forming apparatus according to claim 1, further comprising:

timing detecting means for detecting a timing at which a region on the image carrier member corresponding to the trailing edge of the recording sheet passes the pre-cleaning charge removal means wherein an output level of the pre-cleaning charge removal means is increased on the basis of the result of the timing detection.

9. The image forming apparatus according to claim 1, wherein the transfer-member supporting member is continuously rotated while the transfer-member supporting member attractively supports a recording sheet thereon by an electrostatic force;

wherein the transfer charger repeatedly operates with each rotation of the transfer-member supporting member to transfer the toner image that is formed in accordance with image information onto the recording sheet; and further comprising:

detecting means for detecting a timing of the passing of the recording sheet; and charge applying means for applying charge of the same polarity as the toner to the recording sheet after every rotation of the transfer-member supporting member in response to the result of the timing detection only when a region corresponding to the recording sheet is adjacent thereto, the charge applying means being disposed in a space inside the transfer-member supporting member.

10. An image forming apparatus, comprising:

an image carrier member on which a toner image is formed in accordance with image information;

a transfer-member supporting member, disposed adjacent to the image carrier member, being rotated in a state that the transfer-member supporting member attractively supports a recording sheet thereon by an electrostatic force;

a transfer charger for transferring the toner image from the image carrier member onto the recording sheet by applying charge of the polarity opposite to that of the toner to the rear side of the transfer-member supporting member;

pre-cleaning charge removal means for removing charge from the image carrier member after the toner image is transferred onto the recording sheet; and charge restricting means for substantially preventing the charge of the same polarity as of the toner, generated by the pre-cleaning charge removal means, from attaching to the recording sheet laid on the transfer-member supporting member, said charge restricting means disposed in close proximity with and substantially between said transfer charger and said pre-cleaning charge removal means.

* * * * *